United States Patent
Tseng et al.

(10) Patent No.: US 11,803,975 B2
(45) Date of Patent: Oct. 31, 2023

(54) CORRECTING DEVICE AND CORRECTING METHOD OF REAL-TIME IMAGE

(71) Applicant: ML TECHNOLOGY LTD., New Taipei (TW)

(72) Inventors: Ying-Chang Tseng, New Taipei (TW); Ching-Hsiang Li, New Taipei (TW)

(73) Assignee: ML TECHNOLOGY LTD., New Taipei (TW)

( * ) Notice: Subject to any disclaimer, the term of this patent is extended or adjusted under 35 U.S.C. 154(b) by 115 days.

(21) Appl. No.: 17/564,862

(22) Filed: Dec. 29, 2021

(65) Prior Publication Data

US 2022/0277462 A1    Sep. 1, 2022

Related U.S. Application Data

(60) Provisional application No. 63/153,953, filed on Feb. 26, 2021.

(51) Int. Cl.
    *G06T 7/246* (2017.01)

(52) U.S. Cl.
    CPC .... *G06T 7/248* (2017.01); *G06T 2207/20064* (2013.01); *G06T 2207/30168* (2013.01); *G06T 2207/30241* (2013.01)

(58) Field of Classification Search
    CPC ........... G06T 7/248; G06T 2207/20064; G06T 2207/30168; G06T 2207/30241
    See application file for complete search history.

(56) References Cited

U.S. PATENT DOCUMENTS

| | | | | |
|---|---|---|---|---|
| 2010/0246977 A1* | 9/2010 | Fu | ...................... | G01N 21/6428 |
| | | | | 382/218 |
| 2013/0121597 A1* | 5/2013 | Hsu | .......................... | H04N 5/21 |
| | | | | 382/201 |
| 2019/0114777 A1* | 4/2019 | Maity | ................... | G06T 15/205 |

FOREIGN PATENT DOCUMENTS

| | | | | |
|---|---|---|---|---|
| AU | 2008210192 A1 | * | 8/2009 | ......... G06K 9/00785 |
| CN | 104427233 A | * | 3/2015 | |
| CN | 104427233 A | | 3/2015 | |

(Continued)

OTHER PUBLICATIONS

Office Action dated Feb. 25, 2022 of the corresponding Taiwan patent application No. 110133459.

*Primary Examiner* — Pinalben Patel
(74) *Attorney, Agent, or Firm* — Chun-Ming Shih; HDLS IPR SERVICES

(57) ABSTRACT

A correcting method of a real-time image is disclosed and includes: continuously receiving real-time images from an image inputting device; analyzing an image feature in each real-time image; computing a motion vector of each real-time image based on a feature difference between any two time-adjacent real-time images; computing a moving trajectory predicted value of a latest real-time image based on accumulated motion vectors; computing a compensation value of the latest real-time image when determining that a difference between the moving trajectory predicted value and the motion vector of the latest real-time image is within a correction allowable range, and correcting the latest real-time image by the compensation value; and, resetting the image inputting device and outputting a default image when determining that the difference between the moving trajectory and the motion vector of the latest real-time image exceeds the correction allowable range.

15 Claims, 7 Drawing Sheets

(56) References Cited

FOREIGN PATENT DOCUMENTS

| | | | |
|---|---|---|---|
| FR | 3013488 A1 * | 5/2015 | ............. G06T 7/248 |
| TW | 201319954 A | 5/2013 | |
| TW | 201921319 A | 6/2019 | |

* cited by examiner

CORRECTING DEVICE AND CORRECTING METHOD OF REAL-TIME IMAGE

CROSS-REFERENCE TO RELATED APPLICATION

This patent application claims the benefit of U.S. Provisional Patent Application No. 63/153,953, filed Feb. 26, 2021, which is incorporated by reference herein.

BACKGROUND OF THE DISCLOSURE

Technical Field

The present disclosure relates to a correcting device and a correcting method, and specifically relates to a correcting device and a correcting method for correcting images.

Description of Related Art

The retrieving technology and the displaying technology of real-time images may be applied in different technical fields; however, each field has different problems to be conquered.

In a remote surveillant system, the devices are usually set in specific areas where the maintenance staffs cannot enter arbitrarily, or in specific areas that are too far away from the maintenance staffs. When the devices encounter problems, the maintenance staffs cannot immediately repair the devices to restore the image for outputting. For another example, when using an image capturing device such as a video capture card on an electronic device to capture and record images, the image processing software is easily misjudging that the images are interrupted and stops capturing and recording while the input images are unstable. Therefore, some important images will be lost of recording.

For a further example, in the medical field, a camera (such as an endoscope) is often incorporated with an electrosurgical unit (ESU) or other equipment releasing high frequency signal and inserted into human body for inspections. However, the high frequency may easily affect the image captured by the camera and cause the doctor to misjudge the situation. Also, the camera may capture unstable images as a consequence of temperature or unstable power, etc.

Part of the image processing systems in the market is updated to control the whole system to reboot through a remote instruction, which is sent by the user manually or sent by the system automatically, when the input image is detected to be abnormal. Therefore, the abnormal issue of the input image may be solved. However, in some application fields (especially in the medical field), the user may be unable to manually reboot the system during the inspections (such as during the surgery). In addition, it takes minutes for the entire system to reboot and to restore to a prepared status, but sometimes in some application fields, the users cannot waste their time to wait for the system to reboot.

In order to solve the above problems, the present disclosure provides a correcting device and a correcting method of real-time image, which may automatically determine the status of the real-time image and automatically correct the image, so the system may ensure the quality and the stabilization of the output image, and the users may be prevented from being affected.

SUMMARY OF THE DISCLOSURE

The present disclosure is directed to a correcting device and a correcting method of real-time image, which may automatically detect the status of the input image and automatically correct the image in real-time, so as to output the image stably and consecutively In one of the exemplary embodiments, the correcting device includes:

an image detecting module, connected to an image inputting device to continuously receive a plurality of real-time images;

an image comparing module, connected to the image detecting module, configured to execute an analysis algorithm to analyze an image feature in each of the real-time images, to compute a feature difference of the image feature in any two time-adjacent real-time images, and compute a motion vector of the image feature of each of the real-time images based on the feature difference;

a controlling module, connected with the image inputting device, the image detecting module, and the image comparing module, configured to record the motion vector of each of the real-time images, and accumulate the motion vectors to generate an accumulated motion vector and compute a moving trajectory predicted value of a current real-time image of the plurality of real-time images based on the accumulated motion vector; and an image correcting module, connected with the image comparing module and the controlling module, configured to provide an output image;

wherein, the controlling module is configured to compute a first difference between the moving trajectory predicted value and the motion vector of the current real-time image, compute a compensation value in accordance with the moving trajectory predicted value and the motion vector of the current real-time image when the first difference is within a correction allowable range, and control the image correcting module to perform a correcting action to the current real-time image based on the compensation value to generate the output image and provide a first warning message.

wherein, the controlling module is configured to reset the image inputting device when the first difference is exceeding the correction allowable range, and control the image correcting module to use a default image to be the output image and provide a second warning message.

In one of the exemplary embodiments, the correcting method includes following steps:

a) continuously receiving a plurality of real-time images from an image inputting device;

b) executing an analysis algorithm to analyze an image feature in each of the real-time images;

c) computing a feature difference of the image feature in any two time-adjacent real-time images, and computing a motion vector of the image feature in each of the real-time images based on the feature difference;

d) accumulating the motion vectors to generate an accumulated motion vector and computing a moving trajectory predicted value of a current real-time image of the plurality of real-time images based on the accumulated motion vector;

e) computing a compensation value based on the moving trajectory predicted value and the motion vector of the current real-time image when a first difference between the moving trajectory predicted value and the motion vector of the current real-time image is determined to be within a correction allowable range;

e1) performing a correcting action to the current real-time image based on the compensation value to generate an output image and providing a first warning message following the step e);

f) controlling the image inputting device to reset when determining that the first difference is exceeding the correction allowable range; and f1) obtaining a default image to be the output image and providing a second warning message.

The correcting device of the present disclosure may automatically analyze the input image after the input image is received. If the input image is abnormal but correctable, the correcting device immediately performs a correcting action to the input image. If the input image is too abnormal to be corrected, the correcting device resets a front-ended image inputting device, and outputs a backup image continuously during the reset procedure. Therefore, the correcting device may provide images to the users consecutively and stably, so as to reduce the misjudgment of the users resulted from the abnormal images or the lost images, and to improve the image quality as well.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

Figure 1:
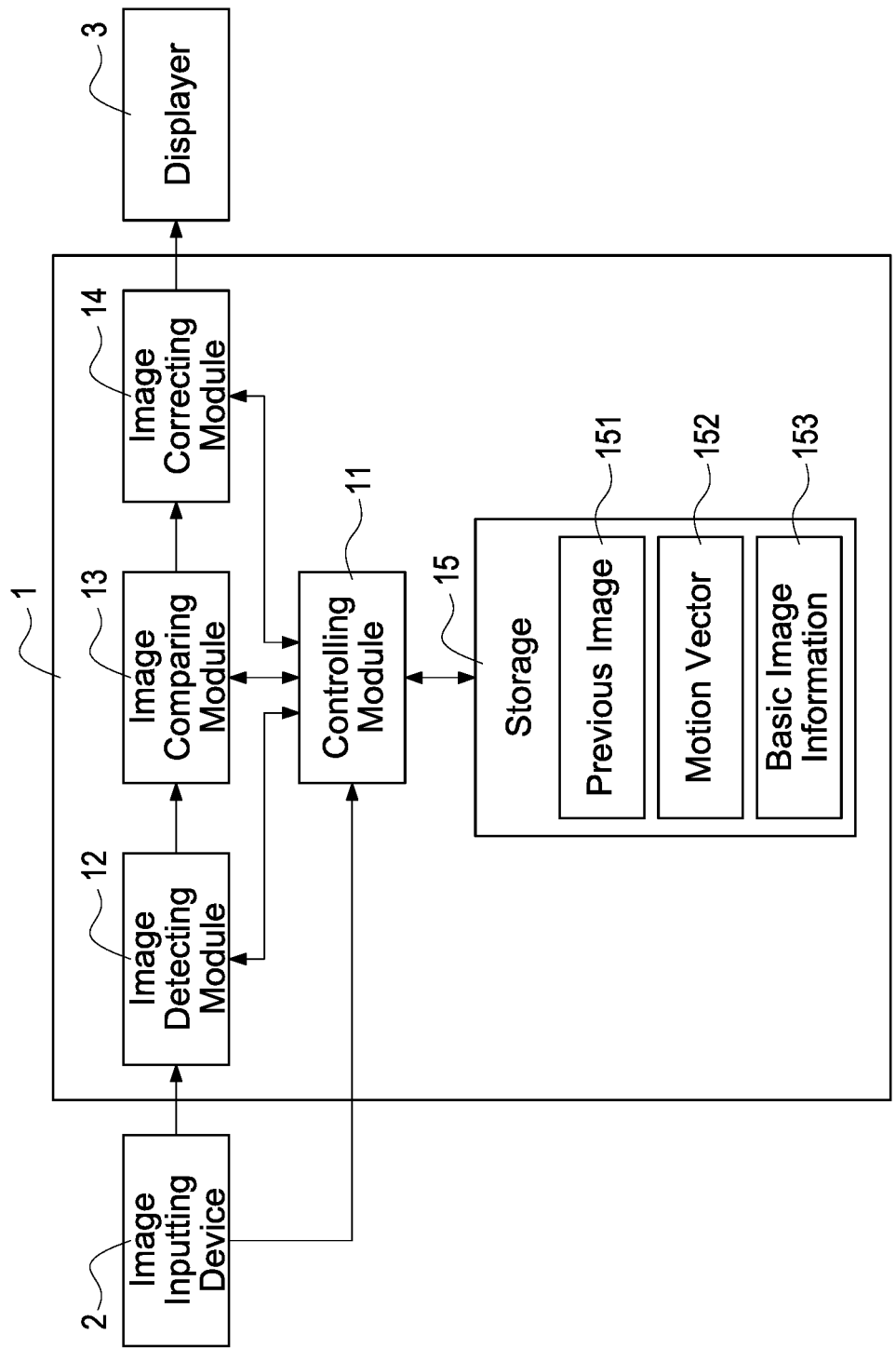
FIG. 1 is a block diagram of a correcting device of a first embodiment according to the present disclosure.

Please refer to FIG. 1, which is a block diagram of a correcting device of a first embodiment according to the present disclosure. As disclosed in FIG. 1, the present disclosure discloses a correcting device of real-time image (referred to as a correcting device 1 hereinafter), the correcting device 1 may be applied to different imaging systems (not shown). Specifically, one end of the correcting device 1 of the present disclosure is connected with an image inputting device 2 of an imaging system to receive an input of a real-time image, another end of the correcting device 1 is connected to a display 3 of the imaging system to consecutively and stably provide an output image.

One technical effect of the present disclosure is that the correcting device 1 may continuously determine the status of the received real-time image, and output the real-time image through the display 3 directly once it is unnecessary for the real-time image to be corrected. If the real-time image needs to be corrected, the correcting device 1 outputs a corrected image generated after a correcting action to the real-time image is performed. If the real-time image is too abnormal to be corrected, the correcting device 1 resets the image inputting device 2, and outputs a default image while resetting the image inputting device 2.

In other words, if an interference to the image inputting device 2 is not strong, the correcting device 1 may directly output the real-time image, or the correcting device 1 may correct the real-time image first and then output a corrected image. If the image inputting device 2 is highly interfered to cause the real-time image to be seriously abnormal or to cause the image inputting device 2 to be unable to output the real-time image, the correcting device 1 may immediately and automatically reset the image inputting device 2 that is configured at a front-end of the imaging system, and keep the displayer 3 that is configured at a back-end of the imaging system to display the image consecutively and stably, so as to prevent the users from being affected.

As shown in FIG. 1, the correcting device 1 may include a controlling module 11, an image detecting module 12, an image comparing module 13, an image correcting module 14, and a storage 15. The image comparing module 13 is connected with the image detecting module 12, the image correcting module 14 is connected with the image comparing module 13, and the controlling module 11 is connected with the image detecting module 12, the image comparing module 13, and the image correcting module 14.

In one embodiment, the controlling module 11 is a hardware module implemented by a micro control unit (MCU) or a graphics processing unit (GPU) of the correcting device 1. The image detecting module 12, the image comparing module 13, and the image correcting module 14 are software modules implemented by a combination of a field programmable gate array (FPGA) and computer executable programming codes. The storage 15 is implemented by a memory or a hard disk drive (HDD). However, the above description is only few embodiments of the present disclosure, but not intended to limit the scope of the provided invention.

The correcting device 1 is connected to the image inputting device 2 through the image detecting module 12, and continuously receives the real-time image from the image inputting device 2. In one of the exemplary embodiments, the image inputting device 2 may be an image sensor such as a camera, an infrared sensor, or a laser sensor, etc. that is used to sense external images in real-time and import the sensed images to the correcting device 1 for further analysis and process. For example, the image inputting device 2 may be a medical endoscope.

In another embodiment, the image inputting device 2 may be a high definition multimedia interface (HDMI), a serial digital interface (SDI), an electronic data processing (EDP) interface, or a mobile industry processor interface (MIPI), etc. that is used to directly input digital images to the correcting device 1 for further analysis and process. For example, the image inputting device 2 may be a video capture card.

It should be mentioned that the controlling module 11 of the correcting device 1 may be connected with the image inputting device 2 through a communication interface such as a serial peripheral interface (SPI) or an I$^2$C interface, etc. In the embodiment, the correcting device 1 may perform a parameter setting procedure for the image inputting device 2 through the controlling module 11. In addition, when the image inputting device 2 encounters an external interference and causes the input image to be abnormal, the controlling module 11 may directly reset the image inputting device 2 through the above communication interface.

In one of the exemplary embodiments, the image detecting module 12 may, after receiving a real-time image, transform the image format of the real-time image into an image format that is supportable to the correcting device 1. Meanwhile, the image detecting module 12 detects a basic image information 153 of the real-time image, such as an exposure intensity, a frequency, a frame per second (FPS), effective image vertical lines, and effective image horizontal pixels, etc. The controlling module 11 receives the basic image information 153 of the real-time image from the image detecting module 12, and stores the basic image information 153 to the storage 15 of the correcting device 1. By storing and analyzing the basic image information 153 of the real-time image, the correcting device 1 may confirm the status of each received real-time image, so as to determine whether to perform a correcting action to each received real-time image or not.

Figure 2:
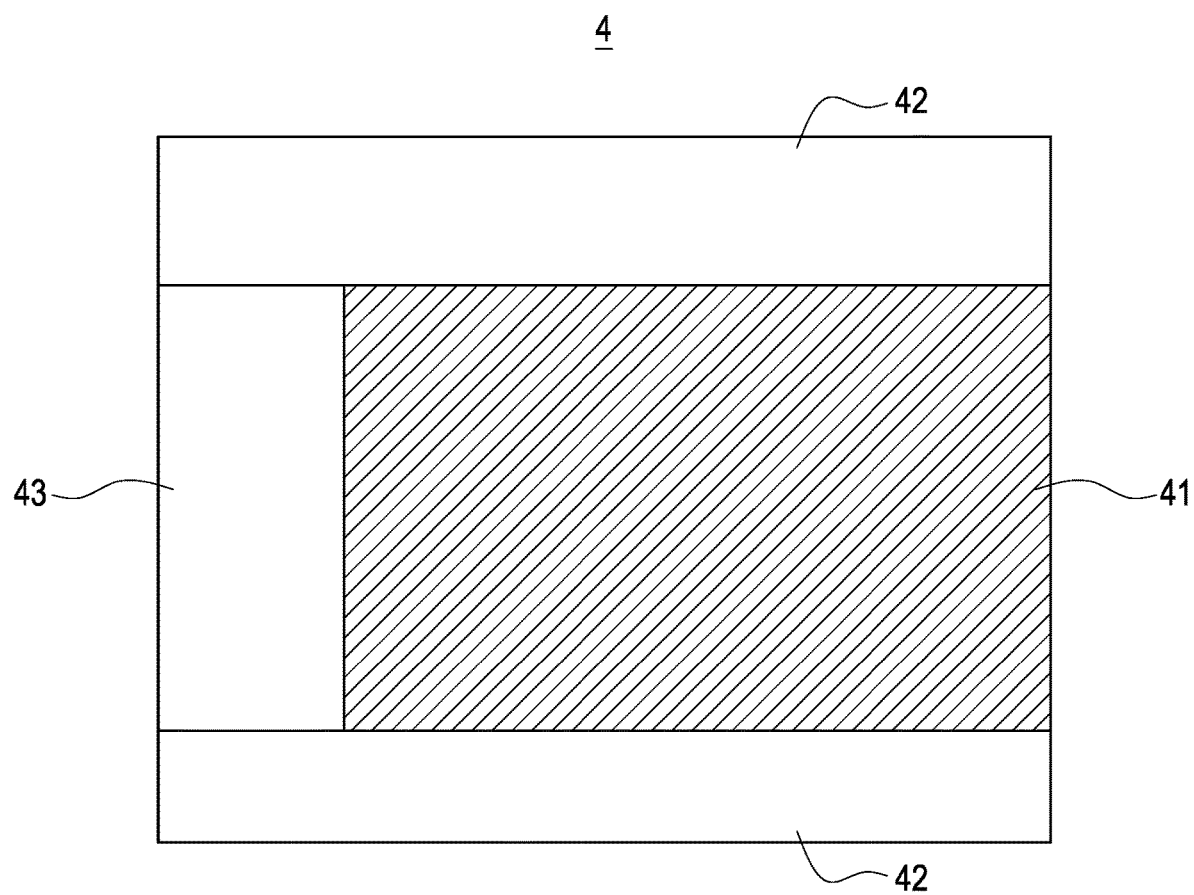
FIG. 2 is a schematic diagram showing an input image.

Please refer to FIG. 1 and FIG. 2 at the same time, wherein FIG. 2 is a schematic diagram showing of an input image. As disclosed, according to the resolution used by the image inputting device 2, each input image 4 may form, based on a fixed horizontal scanning frequency (H-sync) and a vertical scanning frequency (V-sync), an effective image 41 (consisted of effective lines and effective pixels of each line), invalid vertical blanking lines, and invalid horizontal blanking pixels of each line. In the aforementioned embodiment, the correcting device 1 may compare the effective image 41, the vertical blanking lines 42, and the horizontal blanking pixels 43, etc. of every two or more than two time-adjacent real-time images. If the basic image information 153 of the time-adjacent real-time images are too different, the correcting device 1 may determine that the image inputting device 2 is abnormal.

As mentioned above, the correcting device 1 of the present disclosure may determine whether the real-time image needs to be corrected through the basic image information 153. In another embodiment, the correcting device 1 may determine whether a correcting action needs to be performed to the real-time image based on a feature difference(s) of an image feature(s) in at least two time-adjacent real-time images (detailed in the following).

Figure 3:
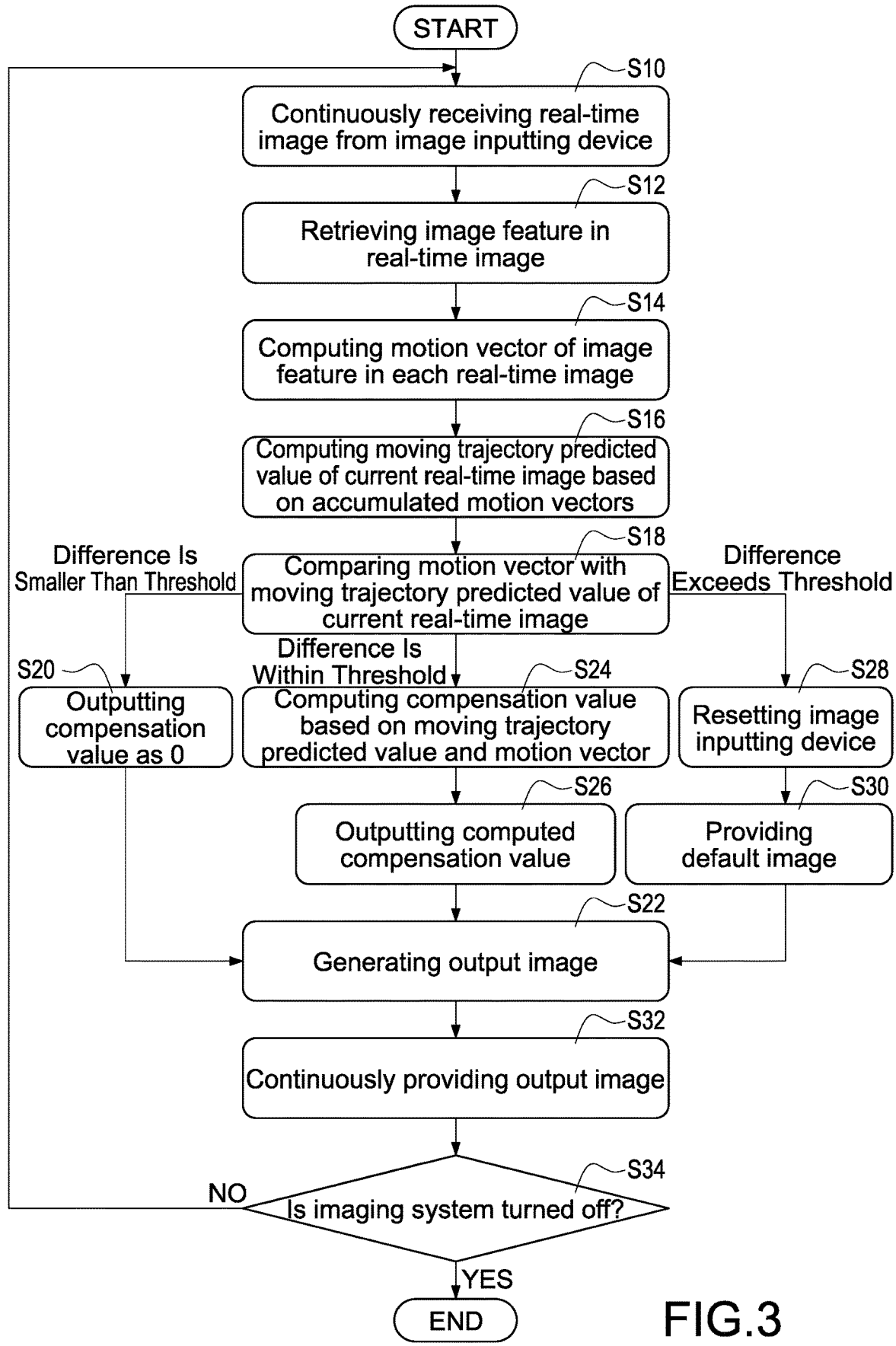
FIG. 3 is a flowchart of a correcting method of a first embodiment according to the present disclosure.

Please refer to FIG. 1 and FIG. 3 at the same time, wherein FIG. 3 is a flowchart of a correcting method of a first embodiment according to the present disclosure. The flowchart shown in FIG. 3 is incorporated with the correcting device 1 as shown in FIG. 1 to interpret how the correcting device 1 performs the correcting action to the real-time image inputted by the image inputting device 2 through the controlling module 11, the image detecting module 12, the image comparing module 13, and the image correcting module 14.

As disclosed in FIG. 3, the correcting device 1 is connected with the image inputting device 2 through the image detecting module 12, and continuously receives the real-time image from the image inputting device (step S10). Next, the correcting device 1 executes an analysis algorithm through the image comparing module 13 to retrieve and to analyze the image feature in the real-time image (step S12).

In one embodiment, the analysis algorithm is executed to retrieve the image feature from one or more specific partitions of the real-time image based on a pixel matrix with a default size (e.g., a 4×4 matrix or an 8×8 matrix, etc.), and to analyze the image feature to determine the status of the entire real-time image. In the embodiment, it is unnecessary for the correcting device 1 to store and analyze the entire real-time image, so the hardware requirement can be reduced and the processing speed can be increased.

In one of the exemplary embodiments, the analysis algorithm is a motion vector algorithm. In the embodiment, the correcting device 1 computes, through the image comparing module 13, a feature difference of same image feature in any two time-adjacent real-time images, and computes a motion vector of the image feature in each real-time image with respect to a previous image (step S14).

More specific, the hardware resources of the correcting device 1 is finite, so the correcting device 1 may only store a previous image 151 through the storage 15 (i.e., a real-time image received at a time point t-1). Therefore, the correcting device 1 may compute the feature difference between the image feature in the current real-time image (i.e., a real-time image received at a time point t) and the same image feature in the previous image 151, so as to compute a motion vector 152 of an image feature of the current real-time image with respect to the same image feature of the previous image 151. In addition, the controlling module 11 obtains the motion vector 152 from the image comparing module 13, and stores the motion vector 152 to the storage 15.

Figure 4:
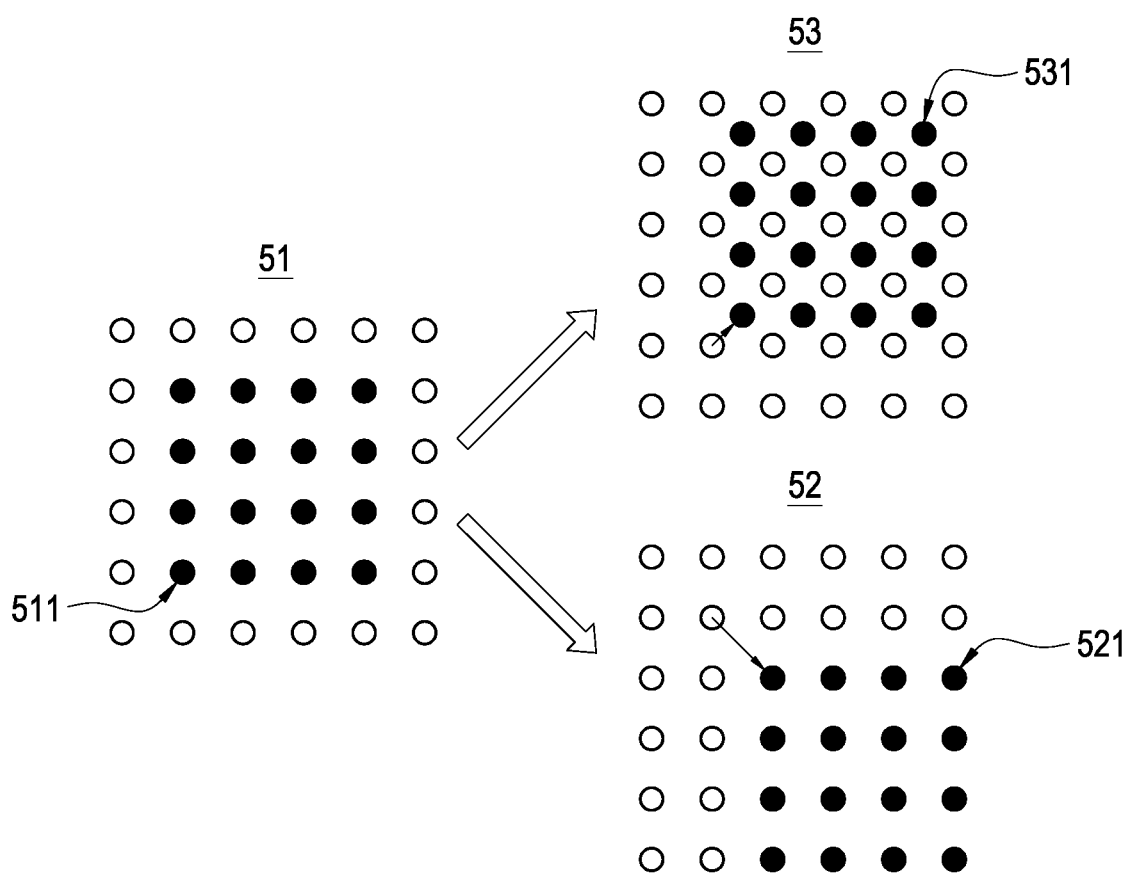
FIG. 4 is a schematic diagram of a motion vector of a first embodiment according to the present disclosure.

Please refer to FIG. 4, which is a schematic diagram of a motion vector of a first embodiment according to the present disclosure. As disclosed in FIG. 4, the image comparing module 13 of the present disclosure may execute the analysis algorithm to retrieve a specific image feature(s) 511 from a previous image 51, and to retrieve same image feature(s) 521 from the current image 52. The analysis algorithm then uses an interpolation function to compute an offset of the same image features 511, 521 in the two images 51, 52, so as to computes the motion vector of the image feature 521 of the current image 52 with respect to the image feature 511 of the previous image 51.

Taking the current image 52 as an example, because the image feature 521 moves from a position of the image feature 511 to an adjacent partition, the analysis algorithm may obtain the motion vector under an integer relationship by computing the positions of the image feature 511 and the image feature 521.

As shown in FIG. 4, the analysis algorithm may retrieve a specific image feature 511 from the previous image 51, and retrieve same image feature 531 from the current image 53. Taking the current image 53 for an example, because the image feature 531 does not move directly from the position of the image feature 511 to an adjacent partition (but to a sub-partition), the analysis algorithm needs to perform an interpolation calculation to the positions of the image feature 511 and the image feature 531 to obtain the motion vector under a decimal relationship.

Figure 5A:
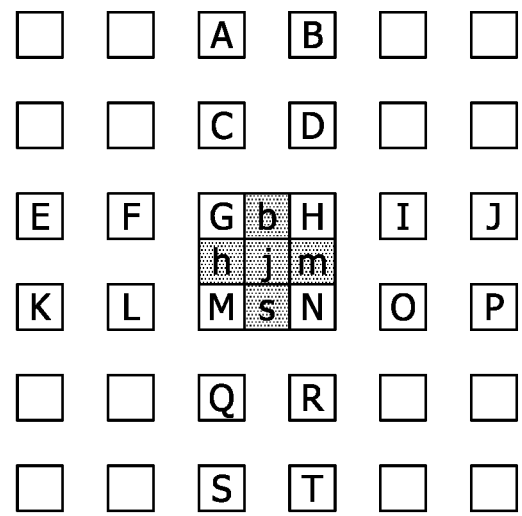
FIG. 5A is a schematic diagram of a motion vector of a second embodiment according to the present disclosure.

Please refer to FIG. 5A at the same time, wherein FIG. 5A is a schematic diagram of a motion vector of a second embodiment according to the present disclosure. In the embodiment of FIG. 5A, the analysis algorithm may use a finite impulse response filter (FIR Filter) with six weighting values including $$\frac{1}{32}, -\frac{5}{32}, \frac{5}{8}, \frac{5}{8}, -\frac{5}{32}, \text{ and } \frac{1}{32}.$$

The FIR Filter may execute the interpolation calculation based on an integer position relationship, so as to obtain the position of a target pixel point(s) and compute the motion vector. In the embodiment of FIG. 5A, the analysis algorithm may compute the positions of target pixel points b, s, h, and m of one image through the following formula:

$$b = \text{round}\left(\frac{E - 5 \times F + 20 \times G + 20 \times H - 5 \times J + J}{32}\right),$$

-continued $$s = \text{round}\left(\frac{K - 5 \times L + 20 \times M + 20 \times N - 5 \times O + P}{32}\right),$$

$$h = \text{round}\left(\frac{A - 5 \times C + 20 \times G + 20 \times M - 5 \times Q + S}{32}\right),$$

$$m = \text{round}\left(\frac{B - 5 \times D + 20 \times H + 20 \times N - 5 \times R + T}{32}\right).$$

Figure 5B:
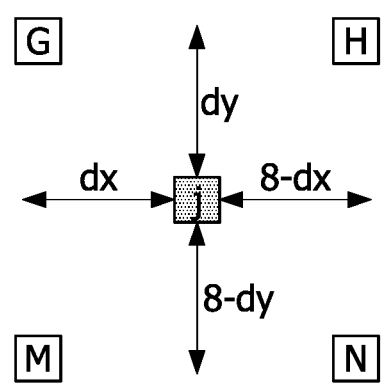
FIG. 5B is a schematic diagram of a motion vector of a third embodiment according to the present disclosure.

Please refer to FIG. 5B at the same time, wherein FIG. 5B is a schematic diagram of a motion vector of a third embodiment according to the present disclosure. In the embodiment of FIG. 5B, the analysis algorithm may execute the interpolation calculation based on a decimal position relationship, so as to obtain the position of a target pixel point and to compute the motion vector. In the embodiment of FIG. 5B, the analysis algorithm may compute the position of a target pixel point j based on the following formula:

$$j = \text{round}\left(\frac{\begin{array}{c}(8-dx)(8-dy) \times G + dx(8-dy) \times \\ H + (8-dx)dy \times M + dxdy \times N\end{array}}{64}\right).$$

The detailed description of the interpolation calculation is omitted here for brevity.

In the above embodiments, the image comparing module 13 of the correcting device 1 computes the motion vector by using a motion vector algorithm to determine the status of the real-time image. For example, the image comparing module 13 may compute a luminance offset, a chrominance offset, a value of discrete wavelet transform (DWT), or a value of continuous wavelet transform (CWT), etc. of same partition(s) in any two time-adjacent real-time images to be the aforementioned feature difference, thereby computing the motion vector. However, the above description is only one embodiment of the present disclosure, but not limited thereto.

It should be mentioned that in other embodiments, the image comparing module 13 may use an AI-based algorithm (such as an edge computing algorithm) to compute the feature difference of same image feature(s) in two time-adjacent real-time images, thereby determining the status variation of the real-time images.

Please refer back to FIG. 3. The correcting device 1 stores, through the controlling module 11, the motion vector 152 of each real-time image computed by the image comparing module 13 to the storage 15. In addition, the controlling module 11 computes a moving trajectory predicted value of the current real-time image based on an accumulated motion vector generated by accumulating multiple motion vectors of multiple real-time images that are sequential in time (step S16).

In particular, the correcting device 1 continuously receives the real-time image from the image inputting device 2, so the multiple received real-time images are sequential in time. Therefore, based on the motion vector(s) 152 of one or more specific image features in multiple previously-received images (e.g., three images respectively and sequentially received at time points t-3, t-2, and t-1), the controlling module 11 may predict the motion vector 152 of the same image feature(s) of a next real-time image in advance before receiving the next real-time image, and use the predicted motion vector 152 as a moving trajectory predicted value of the next real-time image. In other words, if the correcting device 1 may receive the current real-time image at a time point t, the controlling module 11 may predict the moving trajectory of the current real-time image based on the motion vectors 152 of the multiple previously received images before the time point t.

If the image inputting device 1 operates normally, the motion vector 152 of the current real-time image computed by the image comparing module 13 should equals the moving trajectory predicted value predicted in advance by the controlling module 11, or a different between the motion vector 152 and the moving trajectory predicted value should smaller than a threshold.

In the present disclosure, the controlling module 11 receives the motion vector 152 of the current real-time image from the image comparing module 13, and compares the motion vector 152 (which is a physical value) of the current real-time image with the moving trajectory predicted value (which is a predicted value) (step S18). More specific, the controlling module 11 in the step S18 is to compute a difference (referred to as a first difference hereinafter) between the motion vector 152 of the current real-time image and the moving trajectory predicted value, and determine whether the first difference is smaller than a preset correction allowable range, is within the correction allowable range, or is exceeding the correction allowable range.

If the first difference is smaller than the correction allowable range, it indicates that the current real-time image (and the image inputting device 2) is normal, or its abnormality is slight. In such scenario, it is unnecessary for the correcting device 1 to correct the current real-time image, so the controlling module 11 may send a first command to the image correcting module 14 for the image correcting module 14 to directly output the current real-time image to the displayer 3. If the first difference is within the correction allowable range, it indicates that the current real-time image (or the image inputting device 2) is abnormal but its abnormality is correctable. In such scenario, the controlling module 11 may send a second command to the image correcting module 14. The image correcting module 14 is controlled by the second command to perform a correcting action to the current real-time image, and then output the corrected image to the displayer 3.

If the first difference is exceeding the correction allowable range, it indicates that the current real-time image (or the image inputting device 2) is too abnormal to be corrected. In such scenario, the controlling module 11 may send a third command to the image correcting module. The image correcting module 14 is controlled by the third command to replace the current real-time image with a default image and then output the replaced image. Therefore, even if the current real-time image or the image inputting device 2 is abnormal, the correcting device 1 may still output a suitable image to the displayer 3 consecutively and stably.

It should be mentioned that the controlling module 11, the image detecting module 12, the image comparing module 13, and the image correcting module 14 of the present disclosure may operate through pipeline technique; therefore, the correcting device 1 may correct a huge number of sequential images very quickly, so as to output the images consecutively and stably.

For example, while the image detecting module 12 receives a first image (corresponding to a time point t-3), the image comparing module 13 may compute the motion vector of a second image (corresponding to a time point t-2), the controlling module 11 may compute a compensation value needed by a third image (corresponding to a time point t-1), and the image correcting module 14 may perform the correcting action to a fourth image (corresponding to a time point t) and output the corrected image.

The detailed description of the pipeline technique is omitted here for brevity.

If the first difference is determined in the step S18 to be smaller than the correction allowable range (i.e., smaller than a lower limit of the correction allowable range), the controlling module 11 may output a value of "0" as the compensation value of the current real-time image (step S20), and control the image correcting module 14 to generate an output image in accordance with the compensation value (step S22). In particular, it means that it is unnecessary for the current real-time image to be corrected when the compensation value is "0". In other words, the output image equals the current real-time image.

If the first difference is determined in the step S18 to be within the correction allowable range (i.e., between a lower limit and an upper limit of the correction allowable range), the controlling module 11 computes the compensation value in accordance with the moving trajectory predicted value and the motion vector 152 of the current real-time image (step S24). In addition, the controlling module 11 outputs the computed compensation value to the image correcting module 14 (step S26), and controls the image correcting module 14 to generate an output image in accordance with the compensation value (step S22). In particular, it means that the current real-time image needs to be corrected when the compensation value is not "0". In other words, the output image is different from the current real-time image.

In one of the exemplary embodiments, the controlling module 11 in the step S24 computes an average value of an interpolation value of the moving trajectory predicted value and the motion vector 152 of the current real-time image, and uses the average value to be the compensation value as mentioned above. For example, if one of the image features in the current real-time image has a moving trajectory predicted value of −0.9 and has a motion vector 152 as −0.5, the controlling module 11 may compute and determine that a preferred position of this image feature is −0.7 according to a formula $$\frac{(-0.5) + (-0.9)}{2}.$$

of Therefore, the controlling module 11 may compute that the compensation value of this image feature in the current real-time image is −0.2. However, the above description is only one embodiment of the present disclosure, but not limited thereto.

It should be mentioned that if the image correcting module 14 performs the correcting action to the current real-time image based on the compensation value and then outputs the corrected image, it indicates that the image displayed on the displayer 3 is different from the image initially inputted by the image inputting device 2. In order that the user may be prevented from misjudgment due to the corrected image, the correcting module 11 may generate a warning message while generating the compensation value. For example, the warning message may be "Image is interfered, corrected image is temporarily displayed" or similar texts. In the embodiment, the image correcting module 14 may output the generated warning message in company with the output image to the displayer 3 for the user to be notified.

When determining that the first difference is exceeding the correction allowable range in the step S18, the controlling module 11 may send a command to the image inputting device 2 to reset the image inputting device 1 (step S28). Therefore, the problem that the input image is too abnormal to be corrected may be resolved.

In general, to reset the image inputting device 1 arranged at the front-end of the imaging system only costs few seconds. In comparison with resetting the entire imaging system (including a remote surveillance system and a medical endoscope system, etc.), user may be less affected when resetting the image inputting device 1. Taking the medical field for an example, only resetting the front-ended endoscope of an endoscope system but not resetting the entire endoscope system may effective gain the medical golden window.

On the other hand, to prevent the user from losing related information during the reset of the image inputting device 1, or to prevent the software from misjudging that the image inputting procedure is over and turning off automatically, the correcting device 1 may control the controlling module 11 to provide a default image to the image correcting module 14 while resetting the image inputting device 1 (step S30). Therefore, the image correcting module 14 is controlled to directly use the default image as the output image (step S22). When the default image is directly used to replace the current real-time image, it indicates that the current real-time image is too abnormal to be corrected. To solve this problem, the correcting device 1 keeps outputting the default image while resetting the image inputting device 2, so the user may see the screen output consecutively and stably. In addition, when sensing that the image inputting device 2 is reset completely, the controlling module 11 controls the image correcting module 14 to restore the output image generated based on the real-time image provided by the image inputting device 2.

In one embodiment, the controlling module 11 saves a previous image 151 to the storage 15 after each processing procedure, and continuously updates the previous image 151 over time. The previous image 151 is closest to the current real-time image in time, which has less image difference compared with the current real-time image. In one embodiment, the controlling module 11 in the step S30 is to obtain the previous image 151 stored in the storage 15 and provide the previous image 151 to the image correcting module 14, so as to use the previous image 151 to be the default image. However, the above description is only one embodiment of the present disclosure, but not limited thereto.

In the embodiment of FIG. 1, the storage 15 only stores one image (i.e., the previous image 151); however, when the hardware resource is satisfied, the storage 15 may store more than one image.

If the image correcting module 14 uses the default image to be the output image, it indicates that the image displayed on the displayer 3 is different from the image initially inputted by the image inputting device 2. In order that the user may be prevented from misjudgment due to the output image, the correcting module 11 may generate a warning message while providing the default image to the image correcting module 14. For example, the warning message may be "Image inputting device is resetting, image currently displayed is not real-time image" or similar texts. In the embodiment, the image correcting module 14 may output the warning message in company with the generated output image to the displayer 3 to prevent the user from misjudgment.

By using the comparing procedure, the determining procedure, the correcting procedure, and the replacing procedure as discussed above, the correcting device 1 may continuously provide the output image through the image correcting module 14 (step S32). In addition, the controlling module 11 keeps determining whether the entire imaging system is turned off or not (step S34), and re-executes the step S10 through the step S32 before the imaging system is turned off. Therefore, the user may obtain images consecutively and stably from the displayer 3 either the image inputting device 2 is normal or abnormal.

In one embodiment, the correcting device 1 may define the correction allowable range based on a first preset value and a second preset value, wherein the second preset value is greater than the first preset value. In the step S18, the controlling module 11 computes the first difference between the motion vector and the moving trajectory predicted value of the current real-time image, and the controlling module 11 determines that the first difference is smaller than the correction allowable range and it is unnecessary for the real-time image to be corrected when the first difference is smaller than the first preset value, determines that the first difference is within the correction allowable range and it is necessary for the real-time image to be corrected when the first difference is greater than or equal to the first preset value and is smaller than the second preset value, and determines that the first difference is exceeding the correction allowable range and the real-time image is unable to be corrected when the first difference is greater than the second preset value.

In one embodiment, the first preset value may be ±5%, the second preset value may be ±30%. In other words, if the percentage of the difference between the motion vector and the moving trajectory predicted value of the current real-time image is smaller than ±5%, it is unnecessary for the current real-time image to be corrected. If the percentage of the difference between the motion vector and the moving trajectory predicted value of the current real-time image is between ±5% and ±30%, it is necessary for the current real-time image to be corrected. If the percentage of the difference between the motion vector and the moving trajectory predicted value of the current real-time image is greater than ±30%, the current real-time image is unable to be corrected.

However, the above description is only one embodiment of the present disclosure, but not limited thereto.

Figure 6:
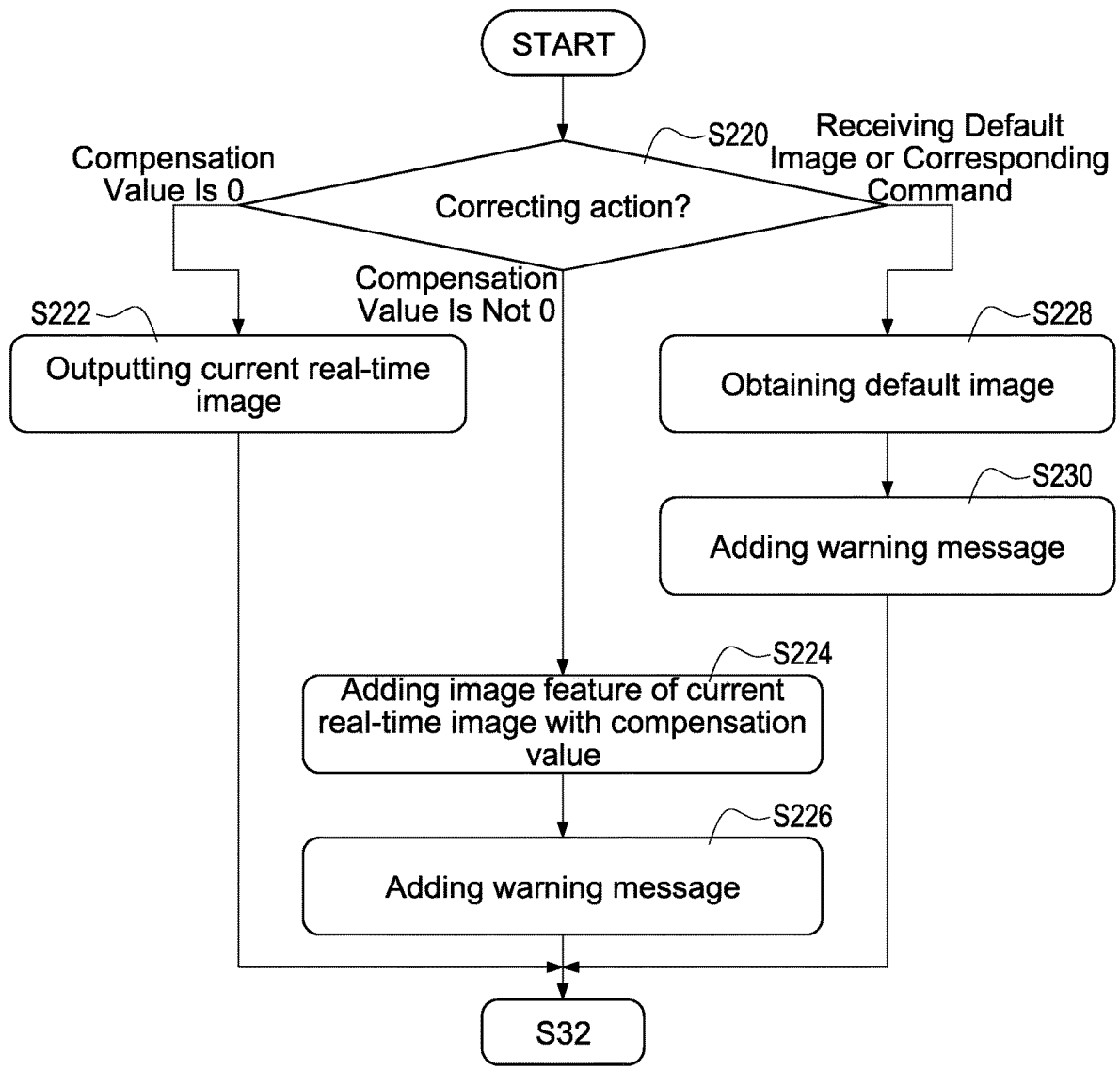
FIG. 6 is a flowchart of generating an output image of a first embodiment according to the present disclosure.

Please refer to FIG. 1, FIG. 3, and FIG. 6 at the same time, wherein FIG. 6 is a flowchart of generating an output image of a first embodiment according to the present disclosure. FIG. 6 is provided to discuss the step S22 of FIG. 3 in how the image correcting module 14 of the correcting device 1 generates different output images correspondingly under different situations.

As disclosed in FIG. 6, in the step S22 of FIG. 3, the image correcting module 14 first determines whether to perform a correcting action to the current real-time image or not (step S220). In the present disclosure, if the compensation value generated by the controlling module 11 is "0", the image correcting module 14 may determine that it is unnecessary to perform the correcting action to the current real-time image. In the meantime, the image correcting module 14 directly outputs the current real-time image (step S222), so as to directly use the current real-time image as the output image. More specific, in the embodiment, the image correcting module 14 adds the current real-time image with the compensation value (which is "0") to generate the output image. Because the compensation value is "0", the output image is identical to the current real-time image.

If the compensation value generated by the controlling module 11 is not "0", the image correcting module 14 may determine that it is necessary to perform the correcting action to the current real-time image. In the meantime, the image correcting module 14 adds the one or more image features of the current real-time image with the corresponding compensation value(s) (step S224), and adds the warning message correspondingly (step S226), so as to generate the output image.

If the image correcting module 14 receives the default image from the controlling module 11, or receives a command of reading the default image, the image correcting module 14 may determine that the current real-time image is too abnormal to be corrected. In the meantime, the image correcting module 14 obtains the default image (step S228), and adds the warning message correspondingly (step S230), so as to generate the output image. In one embodiment, the default image is the previous image that is time-adjacent with the current real-time image (e.g., the previous image 151 as shown in FIG. 1), but not limited thereto.

After the step S222, the step S226, and the step S230, the image correcting module 14 further executes the step S32 of FIG. 3 to keep outputting the output image generated by the image correcting module 145. Therefore, no matter what the status of the current real-time image is, the correcting device 1 of the present disclosure may provide the output image consecutively and stably through the displayer 3 for the user to see and to check.

In the embodiment of FIG. 3, the correcting device 1 computes the difference between the motion vector and the moving trajectory predicted value of the current real-time image, and determines whether it is necessary for the current real-time image to be corrected based on the computed difference. As mentioned above, the image detecting module 12 may detect the basic image information of every real-time image while receiving it. In another embodiment, the correcting device 1 may compute a difference between the basic image information of the current real-time image and another basic image information of one or more previous images, and determines whether it is necessary for the current real-time image to be corrected based on the computed difference.

Figure 7:
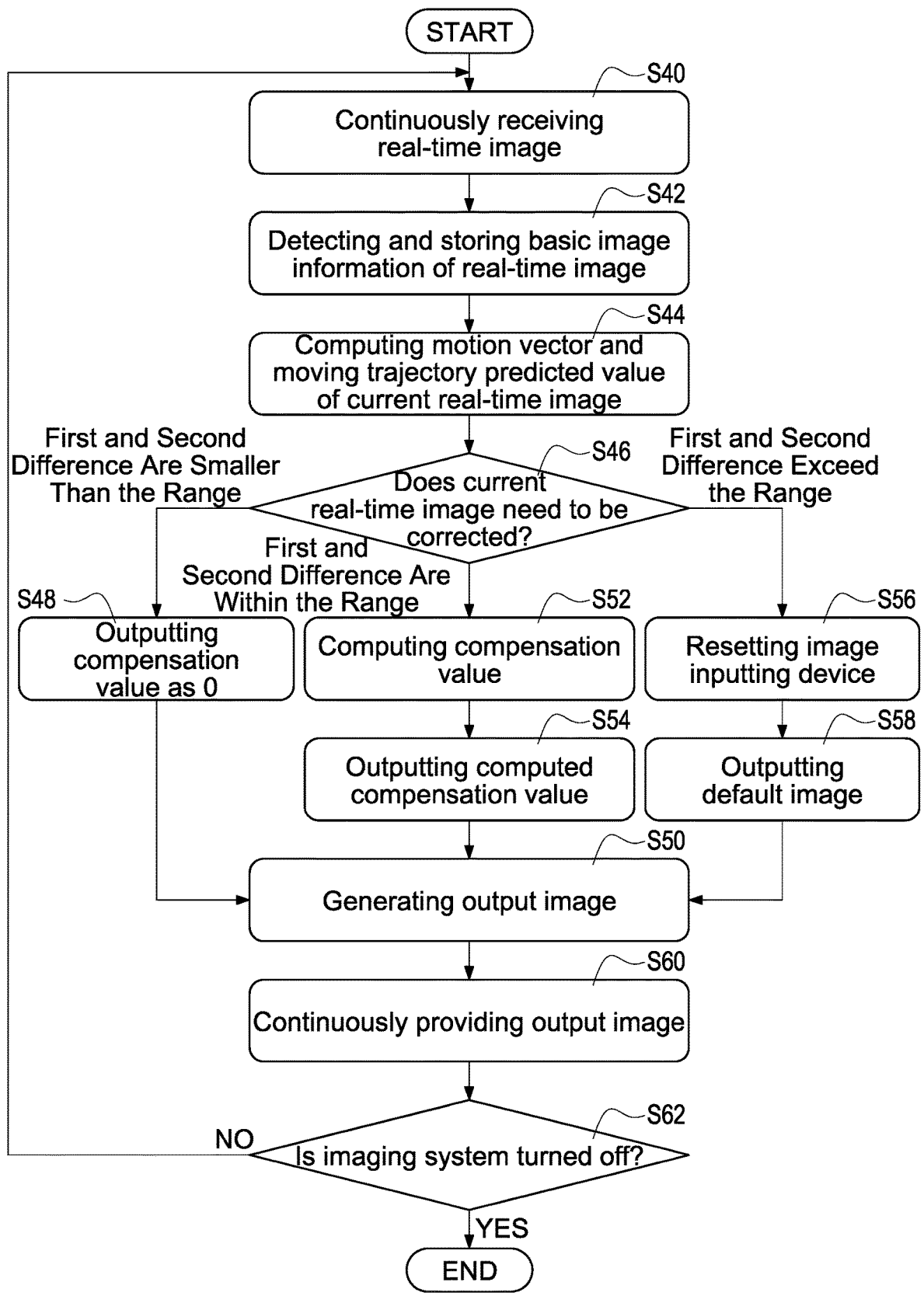
FIG. 7 is a flowchart of a correcting method of a second embodiment according to the present disclosure.

Please refer to FIG. 1 and FIG. 7, wherein FIG. 7 is a flowchart of a correcting method of a second embodiment according to the present disclosure. In the embodiment, the correcting device 1 is connected to the image inputting device 2 through the image detecting module 12 to continuously receive the real-time image (step S40). In addition, the image detecting module 12 keeps detecting and storing the basic image information 153 of the received real-time image (step S42).

In one embodiment, the basic image information 153 may be, for example but not limited to, an exposure intensity, a frequency, a frame per second (FPS), effective image vertical lines, and effective image horizontal pixels, etc. of the received real-time image.

After the step S42, the correcting device 1 analyzes the image feature(s) in each real-time image through the image comparing module 13, and computes the motion vector 152 and the moving trajectory predicted value of the current real-time image through the controlling module 11 and the image comparing module 13 (step S44). The approach of computing the motion vector 152 and the moving trajectory predicted value is same as the disclosure of FIG. 3, the detailed description is omitted here for brevity.

In the embodiment, the controlling module 11 of the correcting device 1 may compute a difference (e.g., a first difference) between the motion vector 152 and the moving trajectory predicted value of the current real-time image, and compute a difference (e.g., a second difference) between the basic image information 153 of the current real-time image and the basic image information 153 of one or more previous real-time images. Therefore, the controlling module 11 may determine whether it is necessary to perform the correcting action to the current real-time image based on the values of the first difference and the second difference (step S46).

In one example, the basic image information 153 of the one or more previous real-time images indicate that the amount of the vertical lines of an effective image existed in the real-time image is 1920 lines, but the basic image information 153 of the current real-time image indicates that the amount of the vertical lines of an effective image existed in the current real-time is 1900 lines. In such scenario, the controlling module 11 may determine that even though the second difference exists between the basic image information 153 of the current real-time image and the basic image information 153 of the previous real-time image(s), the value of the second difference is smaller than the correction allowable range and it is unnecessary for the current real-time image to be corrected.

In another example, the basic image information 153 of the one or more previous real-time images indicate that the amount of the vertical lines of an effective image existed in the real-time image is 1920 lines, but the basic image information 153 of the current real-time image indicates that the amount of the vertical lines of an effective image existed in the current real-time is 1800 lines. In such scenario, the controlling module 11 may determine, based on the value of the second difference, that the current real-time image needs to be corrected.

In another example, the basic image information 153 of the one or more previous real-time images indicate that the amount of the vertical lines of an effective image existed in the real-time image is 1920 lines, but the basic image information 153 of the current real-time image indicates that the amount of the vertical lines of an effective image existed in the current real-time is only 150 lines. In such scenario, the controlling module 11 may determine, based on the value of the second difference, that the current real-time image is too abnormal to be corrected.

As shown in FIG. 7, it is unnecessary for the current real-time image to be corrected when both the first difference and the second difference are smaller than the preset correction allowable range (e.g., a first threshold). Under this circumstance, the controlling module 11 may output the compensation value as "0" (step S48), and control the image correcting module 14 to generate the output image in accordance with the compensation value generated in the step S48 (step S50). In the embodiment, the image correcting module 14 adds the current real-time image with the compensation value to generate the output image. Since the compensation value is "0", the generated output image is identical to the current real-time image.

It is necessary for the current real-time image to be corrected when both the first difference and the second difference are within the correction allowable range (e.g., greater than or equal to the first threshold and smaller than a second threshold). Under this circumstance, the controlling module 11 computes the compensation value correspondingly in accordance with the motion vector 152 and the moving trajectory predicted value of the current real-time image (step S52). In addition, the controlling module 11 outputs the compensation value to the image correcting module 14 (step S54), so as to control the image correcting module 14 to generate the output image based on the compensation value generated in the step S54 (step S50).

In the step S52, the controlling module 11 computes an average value of an interpolation value of the motion vector 152 and the moving trajectory predicted value of the current real-time image, and uses the average value as the compensation value. In the step S54, the image correcting module 14 respectively adds one or more image features in the current real-time image with the corresponding compensation value (s) to generate the output image. Since the compensation value is not "0", the output image is different from the current real-time image. It should be mentioned that in the embodiment, the image correcting module 14 adds the warning message to the output image, so as to notify the user that the image currently displayed on the displayer 3 is a corrected image, which is different from the image initially inputted by the image inputting device 2.

The current real-time image is determined too abnormal to be corrected when both the first difference and the second difference are exceeding the correction allowable range (e.g., greater than the second threshold). Under this circumstance, the controlling module 11 directly sends a control command to the image inputting device 2 to reset the image inputting device 2 (step S56). In addition, the controlling module 11 outputs the default image (e.g., the previous image 151 stored in the storage) to the image correcting module 14 (step S58), so as to control the image correcting module 14 to use the default image received in the step S58 as the output image (step S50).

In the embodiment, the image correcting module 14 adds the warning message to the output image as well, so as to notify the user that the image currently displayed on the displayer 3 is different from the real-time image initially inputted by the image inputting device 2.

After the step S50, the correcting device 1 may continuously provide the generated output image through the image correcting module 14 (step S60). Also, the correcting device 1 keeps determining whether the imaging system is turned off through the controlling module 11 (step S62), and re-executes the step S40 through the step S60 before the imaging system is turned off. Therefore, the correcting device 1 may output the images consecutively and stably even if the image inputting device 2 is interfered or the current real-time image is abnormal.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A correcting device of a real-time image, comprising:
an image detecting module, connected to an image inputting device to continuously receive a plurality of real-time images;
an image comparing module, connected to the image detecting module, configured to execute an analysis algorithm to analyze an image feature in each of the real-time images, to compute a feature difference of the image feature in any two time-adjacent real-time images, and compute a motion vector of the image feature of each of the real-time images based on the feature difference, wherein the analysis algorithm is a motion vector algorithm;
a controlling module, connected with the image inputting device, the image detecting module, and the image comparing module, configured to record the motion vector of each of the real-time images, and accumulate the motion vectors to generate an accumulated motion vector and compute a moving trajectory predicted value of a current real-time image of the plurality of real-time images based on the accumulated motion vector; and an image correcting module, connected with the image comparing module and the controlling module, configured to provide an output image;

wherein, the controlling module is configured to compute a first difference between the moving trajectory predicted value and the motion vector of the current real-time image, compute a compensation value in accordance with the moving trajectory predicted value and the motion vector of the current real-time image when the first difference is within a correction allowable range, and control the image correcting module to perform a correcting action to the current real-time image based on the compensation value to generate the output image and provide a first warning message;

wherein, the controlling module is configured to reset the image inputting device when the first difference is exceeding the correction allowable range, and control the image correcting module to use a default image to be the output image and provide a second warning message, wherein the default image is a previous image that is time-adjacent to the current real-time image;

wherein the controlling module is configured to determine that the first difference is within the correction allowable range when the first difference is greater than or equal to a first preset value and is smaller than a second preset value, and to determine that the first difference is exceeding the correction allowable range when the first difference is greater than the second preset value, wherein the first preset value is smaller than the second preset value.

2. The correcting device in claim 1, wherein the feature difference is a luminance offset, a chrominance offset, a value of discrete wavelet transform (DWT), or a value of continuous wavelet transform (CWT) of same partition in any two time-adjacent real-time images.

3. The correcting device in claim 1, wherein the image inputting device is an image sensor, a high definition multimedia interface (HDMI), a serial digital interface (SDI), an electronic data processing (EDP) interface, or a mobile industry processor interface (MIPI).

4. The correcting device in claim 1, wherein the first preset value is ±5%, and the second preset value is ±30%.

5. The correcting device in claim 1, the controlling module is configured to compute, when the first difference is within the correction allowable range, an average value of an interpolation value of the moving trajectory predicted value and the motion vector of the current real-time image, and use the average value to be the compensation value.

6. The correcting device in claim 1, wherein the controlling module is configured to set the compensation value as 0 when the first difference is smaller than the first preset value, and to control the image correcting module to perform the correcting action to the current real-time image based on the compensation value to generate the output image.

7. The correcting device in claim 6, wherein the image detecting module is configured to detect a basic image information of each of the real-time images, and the controlling module is configured to accumulate the basic image information of the plurality of real-time images to generate an accumulated basic image information and compute a second different between the accumulated basic image information and the basic image information of the current real-time image, and the controlling module is configured to set the compensation value as 0 when both the first difference and the second difference are smaller than the first preset value, to compute the compensation value based on the moving trajectory predicted value and the motion vector of the current real-time image when both the first difference and the second different are within the correction allowance range, and to reset the image inputting device when both the first difference and the second difference are exceeding the correction allowance range.

8. The correcting device in claim 7, wherein the basic image information is at least one of an exposure intensity, a frequency, a frame per second (FPS), effective image vertical lines, and effective image horizontal pixels of each of the real-time images.

9. A correcting method of a real-time image, comprising:
a) continuously receiving a plurality of real-time images from an image inputting device;
b) executing an analysis algorithm to analyze an image feature in each of the real-time images;
c) computing a feature difference of the image feature in any two time-adjacent real-time images, and computing a motion vector of the image feature in each of the real-time images based on the feature difference;
d) accumulating the motion vectors to generate an accumulated motion vector and computing a moving trajectory predicted value of a current real-time image of the plurality of real-time images based on the accumulated motion vector;
e) computing a compensation value based on the moving trajectory predicted value and the motion vector of the current real-time image when a first difference between the moving trajectory predicted value and the motion vector of the current real-time image is determined to be within a correction allowable range;
e1) performing a correcting action to the current real-time image based on the compensation value to generate an output image and providing a first warning message following the step e);
f) controlling the image inputting device to reset when determining that the first difference is exceeding the correction allowable range; and
f1) obtaining a default image to be the output image and providing a second warning message, wherein the default image is a previous image that is time-adjacent to the current real-time image;
wherein the step e) comprises determining that the first difference is within the correction allowable range when the first difference is greater than or equal to a first preset value and smaller than a second preset value, wherein the first preset value is smaller than the second preset value;
wherein the step f) comprises determining that the first difference is exceeding the correction allowable range when the first difference is greater than the second preset value.

10. The correcting method in claim 9, wherein the step e) comprises computing an average value of an interpolation value of the moving trajectory predicted value and the motion vector of the current real-time image and using the average value to be the compensation value.

11. The correcting method in claim 9, further comprising:
g) setting the compensation value as 0 when determining that the first difference is smaller than the first preset value; and
g1) performing the correcting action to the current real-time image based on the compensation value to generate the output image following the step g).

12. The correcting method in claim 11, wherein the step a) comprises detecting a basic image information of each of the real-time images, and the correcting method further comprises a step a1): accumulating the basic image information of the plurality of real-time images to generate an accumulated basic image information, and computing a second difference between the accumulated basic image information and the basic image information of the current real-time image; wherein, the step g) comprises setting the compensation value as 0 when both the first difference and the second difference are smaller than the first preset value, the step e) comprises computing the compensation value when both the first difference and the second difference are within the correction allowable range, and the step f) comprises resetting the image inputting device when both the first difference and the second difference are exceeding the correction allowable range.

13. The correcting method in claim 12, wherein the basic image information is at least one of an exposure intensity, a frequency, a frame per second (FPS), effective image vertical lines, and effective image horizontal pixels of each of the real-time images.

14. The correcting method in claim 9, wherein the first preset value is ±5%, and the second preset value is ±30%.

15. The correcting method in claim 9, wherein the step c) comprises computing a luminance offset, a chrominance offset, a value of discrete wavelet transform (DWT), or a value of continuous wavelet transform (CWT) of same partition in any two time-adjacent real-time images to generate the feature difference.

* * * * *